(12) United States Patent
Heifets (10) Patent No.: US 7,189,051 B1
(45) Date of Patent: Mar. 13, 2007

(54) WIND POWER PLANT

(76) Inventor: Nuhim Heifets, 801 N. Kings Rd., #107, Los Angeles, CA (US) 90069

( * ) Notice: Subject to any disclaimer, the term of this patent is extended or adjusted under 35 U.S.C. 154(b) by 0 days.

(21) Appl. No.: 11/368,567

(22) Filed: Mar. 6, 2006

Related U.S. Application Data (60) Provisional application No. 60/731,573, filed on Oct. 28, 2005, provisional application No. 60/754,814, filed on Dec. 29, 2005.

(51) Int. Cl.
*F03D 3/02* (2006.01)
(52) U.S. Cl. .......................... 415/4.2; 415/60; 415/224; 415/907; 416/120; 416/170 R; 416/123; 416/198 R
(58) Field of Classification Search ................. 415/4.2, 415/4.4, 53.1, 60, 224, 907; 416/120, 170 R, 416/122, 123, 198 R
See application file for complete search history.

(56) References Cited

U.S. PATENT DOCUMENTS

| | | | | |
|---|---|---|---|---|
| 4,017,204 A | * | 4/1977 | Sellman | 415/4.4 |
| 4,074,951 A | * | 2/1978 | Hudson | 415/2.1 |
| 4,191,505 A | * | 3/1980 | Kaufman | 415/2.1 |
| 4,764,683 A | * | 8/1988 | Coombes | 290/55 |
| 5,495,128 A | * | 2/1996 | Brammeier | 290/55 |
| 6,942,454 B2 | | 9/2005 | Ohlmann | |

* cited by examiner

*Primary Examiner*—Ninh H. Nguyen
(74) *Attorney, Agent, or Firm*—Lewis B. Sternfels (57) ABSTRACT

A wind power plant includes four main elements: a foundation (29), at least one supporting structure (21), a carrying construction (23) having a vertical axis (25) and being rotatable around the vertical axis, and at least one rotor (45), (49), (52) positioned on the carrying construction. The rotors can have horizontal, vertical, and inclined axes of rotation in different combinations. Each rotor has at least two blades (53) arranged along its axis of rotation. Since the rotors used in the invention have a small diameter, the wind power plant can produce energy under high and low wind speeds, consequently producing more energy per year than known wind turbines. Also, because the rotors have rectilinear blades for their manufacture expensive composite materials and complicated expensive equipment are not required. For these reasons the wind power plant of this invention will produce energy at lower cost.

15 Claims, 6 Drawing Sheets

View B

View B

FIG. 6

Section A-A

WIND POWER PLANT

CROSS-REFERENCE TO RELATED APPLICATIONS

This application claims the benefit of provisional patent applications Ser. No. 60/731,573, filed 2005 Oct. 28 and Ser. No. 60/754,814, filed Dec. 29, 2005 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

This invention relates to the utilization of wind energy, and more specifically, to the utilization of wind energy through the use of wind turbines.

2. Prior Art

A wind turbine is a machine for converting the kinetic energy of wind into mechanical energy. All of the known wind turbines can produce useful energy only as a result of sufficient wind speed. Generally speaking, the bigger is the wind turbine, the larger is the amount of useful energy that it can produce. On the other hand, the bigger is the size of wind turbine, the higher is the wind speed required for the wind turbine to produce useful energy. However, there are many locations in the world where the prevailing wind speeds are too low for the known wind turbines to produce useful energy. Accordingly, the capabilities of current wind turbines to practically utilize wind energy are limited.

U.S. Pat. No. 6,942,454 to Ohlmann (2005) discloses a vertical axis wind turbine. However, this wind turbine cannot be used for producing a high power output because the turbine is limited to only two rotors. Additionally, the structure of the wind turbine disclosed in Ohlmann is ill-equipped for production because it is non-rigid and unreliable and can operate under only low wind speeds and when rotors are short.

SUMMARY OF THE INVENTION

The wind power plant of the present invention uses rotors having a diameter that is smaller than the diameter of the rotors in presently utilized wind turbines. Consequently, an output shaft on the present invention will rotate with higher speed than its counterpart in the known wind turbines. Thus the wind power plant of the present invention can produce useful energy at lower wind speeds as compared to the presently utilized wind turbines.

Accordingly, the present invention has following advantages:

1. It allows for the production of useful energy in world areas with prevailing low wind speeds in which the currently utilized wind turbines cannot produce useful energy.

2. It allows for the production of useful energy both at wind speeds when the presently utilized wind turbines can, and at wind speeds lower when the presently utilized wind turbines cannot produce useful energy.

3. It allows for the production of more useful energy per year than the presently utilized wind turbines.

4. It allows for the creation of high power wind plants in word areas where low wind speeds prevail.

In addition to the above-stated advantages, the rotors in the present invention have rectilinear blades arranged along of the axis of rotor rotation. Accordingly, to manufacture the rotors of the present invention, one does not need any complicated expensive machinery, any expensive composite materials, or any skilled specialists, As a result of including the above-listed advantages, the present invention is capable of both efficient production of clean and cheap energy and of word-wide utilization.

The present invention has many embodiments. All of the embodiments comprise the following four main elements:

a foundation;

at least one supporting structure, only one supporting structure being installed on the foundation;

a carrying construction arranged on the supporting structures, the carrying construction having a vertical axis and being rotatable about the vertical axis; and at least one rotor positioned on the carrying construction.

An element of the wind power plant on which the rotors are positioned is called "the carrying construction" in this specification and in the claims.

There are two main groups of the invention. First group represents embodiments, where the supporting structure installed on the foundation is not fixedly secured to it. The carrying construction is fixedly secured to the supporting structures. The carrying construction is rotatable about its vertical axis jointly with the supporting structures. Second group represents embodiments, where the supporting structure installed on the foundation is fixedly secured to it. The carrying construction is rotatable about its vertical axis independently from the supporting structure installed on the foundation.

In simplest cases, the carrying construction is a pillar or a horizontal beam. On this pillar or beam at least one rotor is positioned. As the quantity of rotors increases, the carrying construction becomes a pillar which has either branching horizontal beams only, inclined beams only, or horizontal and inclined beams together.

In other cases, the carrying construction is simply a very long horizontal beam. Yet in other cases when it is necessary for a large quantity of rotors to be positioned on the carrying construction, the carrying construction has a pillar arranged along its vertical axis with at least two horizontal beams branching off in opposite directions, and at least two supplementary pillars bearing against supplementary supporting structures. In another case, when it is necessary for a large quantity of rotors to be positioned on the carrying construction, the carrying construction is a very long horizontal beam having at least two supplementary pillars bearing against supplementary supporting structures.

In this specification and in claims, the pillars and the beams are referred to as members of the carrying construction.

In the simplest cases, a single rotor is positioned on the carrying construction. This single rotor has either a horizontal or a vertical axis of rotation. In cases when two rotors are positioned on the carrying construction, the rotors have either horizontal axes of rotation only, vertical axes of rotation only, or inclined axes of rotation only. In cases when more then two rotors are positioned on the carrying construction, the rotors have either horizontal axes of rotation only, vertical axes of rotation only, inclined axes of rotation only, or different combinations of horizontal, vertical, and inclined axes of rotation.

Each rotor has at least two blades arranged along its axis of rotation. The rotors are positioned on the pillars and on the beams in one or two rows along the borders of these carrying construction members.

The invention has other design features as well. Further features of the invention will be apparent from the attached drawings and a description of the illustrative embodiments of the invention.

DETAILED DESCRIPTION OF THE INVENTION

Figure 1:
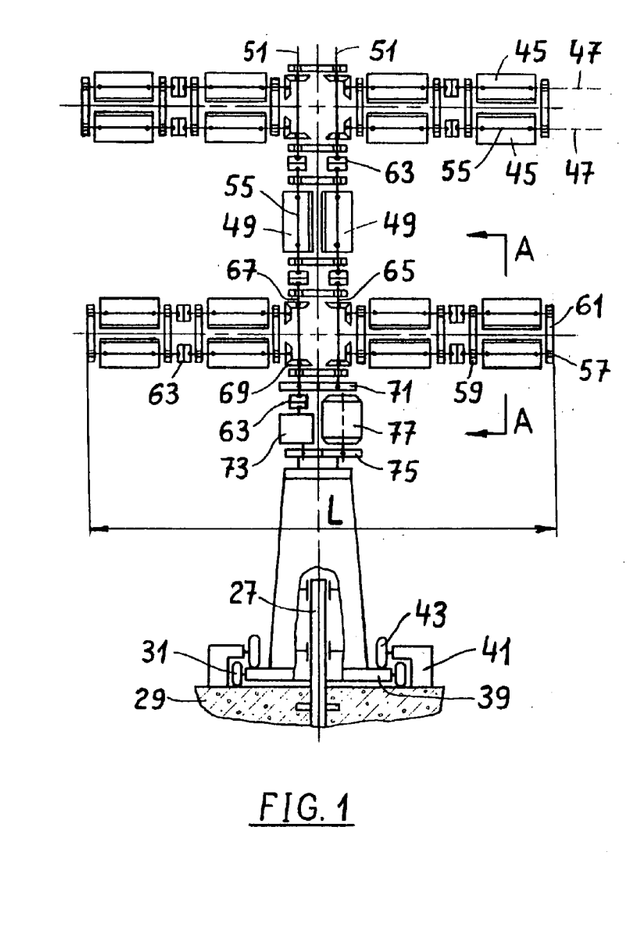
FIG. 1 is a front view of one embodiment of the invention, which has rotors with horizontal and vertical axes of rotation.
Figure 2:
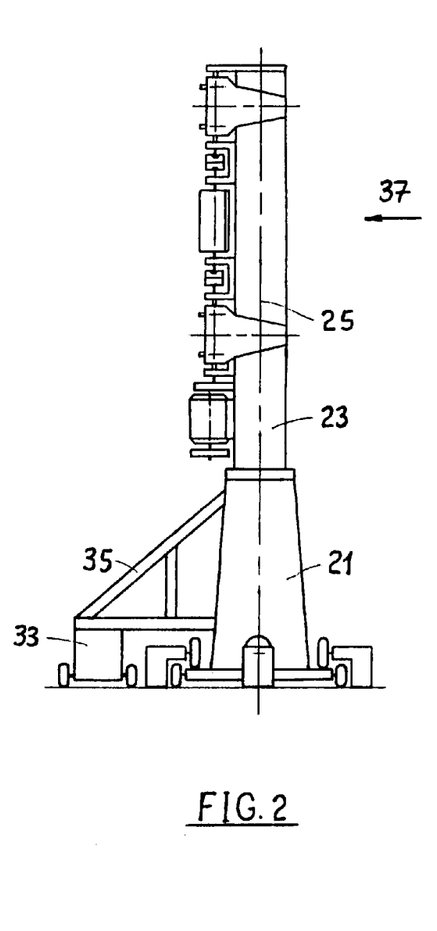
FIG. 2 is a right-side view of the embodiment shown in FIG. 1.
Figure 7:
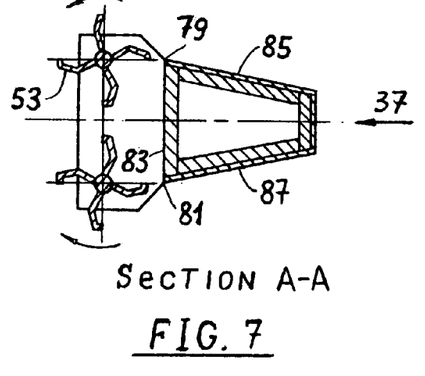
FIG. 7 is a transverse sectional view taken on line A—A in FIGS. 1 and 3.

FIGS. 1, 2 and 7 illustrate one of the embodiments of the wind power plant of the present invention. The plant includes a supporting structure (mast, tower) 21 and a carrying construction 23. The carrying construction 23 is arranged on the supporting structure 21 and has a vertical axis 25. In this embodiment, the carrying construction 23 is fixedly secured to the supporting structure 21, i.e., they are integral. The carrying construction 23 is rotatable jointly with the supporting structure 21 about the vertical axis 25. This is provided by a round bar 27 fixed in a foundation 29. The supporting structure 21 is installed on turning elements (wheels or rollers) 31. The turning of the plant is enabled by a truck 33. The truck 33 is fixed to the supporting structure 21 by a connecting construction 35. The truck 33 also prevents the plant from turning over under wind influence since it is arranged on the side opposed to the wind pressure. Referring to FIG. 2, an arrow 37 shows the wind direction. The truck 33 is driven by a motor (not shown).

Referring back to FIG. 1, the supporting structure has a platform 39. Around the platform 39, brackets 41 are installed on the foundation 29. On the brackets 41 other turning elements 43 are positioned, which also act to prevent the plant from turning over.

On the carrying construction 23 rotors 45 having horizontal axes of rotation 47 and rotors 49 having vertical axes of rotation 51 are positioned. Referring to FIG. 7, the rotors have at least two blades 53 arranged along the axes of rotation. Referring back to FIG. 1, each rotor has a shaft 55, which rotates in bearings 57 placed in arms 59 and 61. The arms 59 and 61 are attached to the carrying construction 23. The rotors are arranged in two rows. The shafts of aligned rotors are connected by couplings 63.

There are vertical shafts 65 and 67 on the carrying construction 23. The shafts 55 of the vertical rotors 49 are connected by couplings 63 to the vertical shafts 65 and 67. The shafts 55 of the horizontal rotors 45 are connected to the vertical shafts 65 and 67 by a mechanical transmission consisting of two bevel-gears 69. The vertical shafts 65 and 67 are connected to each other by a mechanical transmission consisting of two gears 71. One of the vertical shafts 67 is connected by coupling 63 to an input shaft of a gear-box 73. An output shaft of the gear-box 73 is connected by a mechanical transmission consisting of two gears 75 to a driven device 77 (a generator or a pump).

Referring to FIG. 7, the rotors 45 and 49 are positioned along the borders 79 and 81 of the carrying construction 23. The rotors are arranged so that less than half of the rotors' diameter protrudes out of the borders of the carrying construction.

The transverse section of the carrying construction may have a special shape in locations where the rotors are positioned. This section may be shaped by a first straight line 83 arranged nearest to said rotors, and two other straight lines 85 and 87 adjoining said first straight line at an acute included angle.

When the plant operates, under wind pressure the rotors acquire rotational motion. The rotors mounted in one row acquire rotational motion in one direction, while the rotors mounted in another row acquire rotational motion in opposite direction. Turning moment of the horizontally arranged rotors transmits through the bevel-gears 69 to the vertical shaft on which the vertical rotors are arranged. Since the vertical shafts are connected by the gears 71, total turning moment is transmitted to the gear-box 73 through the coupling 63. Then, the total turning moment is transmitted to the driven device through the gears 75.

Figure 3:
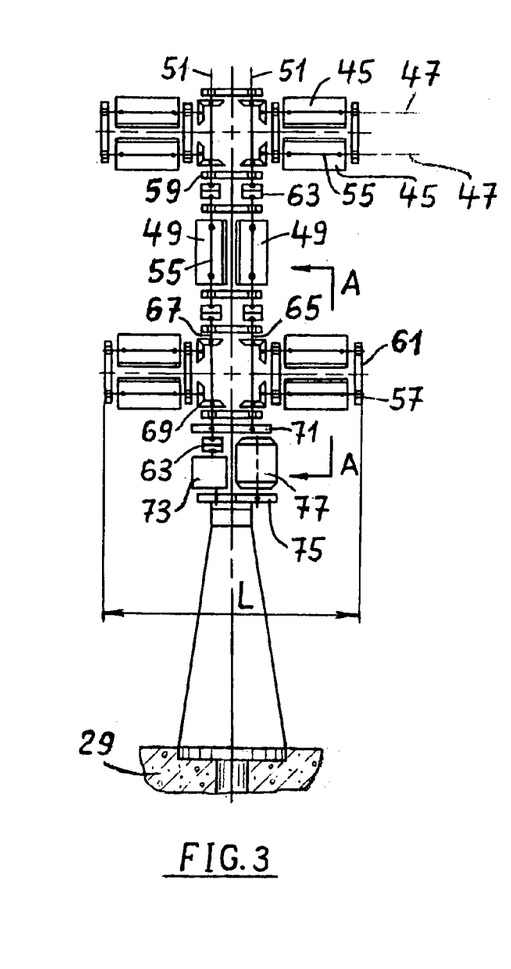
FIG. 3 is a front view of another embodiment of the invention, which has rotors with horizontal and vertical axes of rotation.
Figure 4:
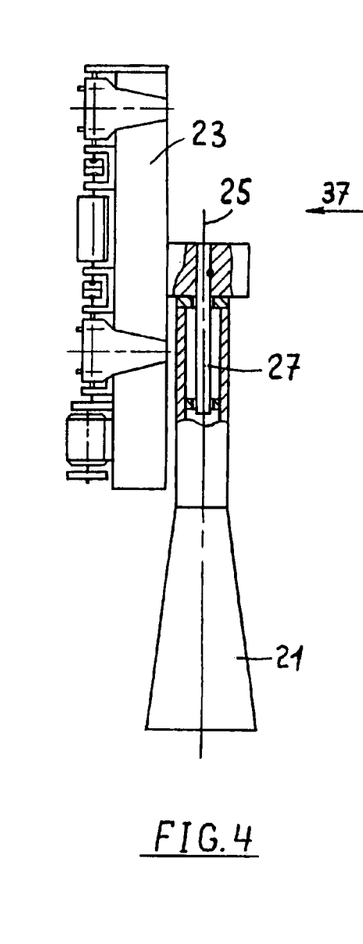
FIG. 4 is a right-side view of the embodiment shown in FIG. 3.

FIGS. 3, 4 and 7 show another embodiment of the wind power plant. This embodiment distinguishes from the embodiment shown in FIGS. 1 and 2 in that the supporting structure 21 is fixedly secured to the foundation and is immovable. The carrying construction 23 is rotatable around the vertical axis 25 and about the immovable supporting structure 21. This is provided by the round bar 27 fixed in the carrying construction 23. The rotation of the carrying construction can be accomplished by any known method utilized for Horizontal Axis Wind Turbines.

The reference numerals on all figures are the same as on FIGS. 1, 2 and 7 for the same elements.

The embodiments shown in FIGS. 1–4 and 7 may include more than one supporting structure. The number of supporting structures depends on the size "L" of the carrying construction. When the size "L" increases, the number of the supporting structures increases too. If three supporting structures are needed, one of them is positioned on the vertical axis 25, and two supplementary ones are positioned symmetrically to the vertical axis 25, and so on. The supplementary supporting structures are fixedly secured to the carrying construction and are installed on turning elements.

Figure 5:
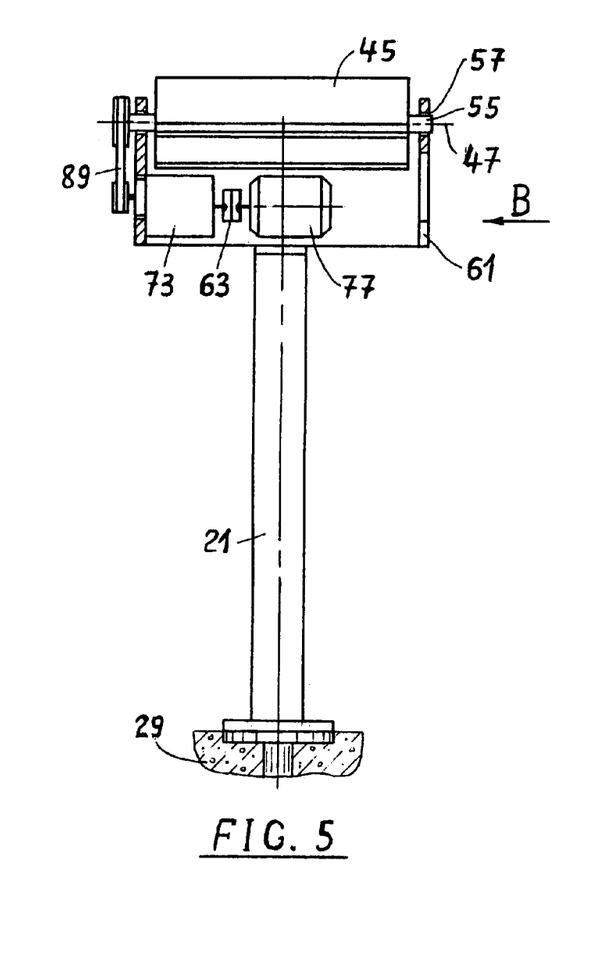
FIG. 5 is a front view of another embodiment of the invention, which has a single rotor with a horizontal axis of rotation.
Figure 6:
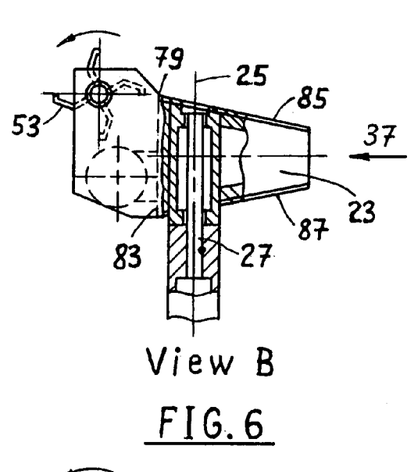
FIG. 6 is a partial right-side view of the embodiment shown in FIG. 5.

FIGS. 5 and 6 show another embodiment of the wind power plant. This embodiment has only a single rotor 45 and is therefore the simplest embodiment. The rotor 45 has a horizontal axis of rotation 47. The supporting structure 21 is fixedly secured on the foundation 29 and is immovable. The carrying construction 23 is rotatable around the vertical axis 25 and about the immovable supporting structure. This is provided by the round bar 27 fixed in the supporting structure. The rotation of the carrying construction can be accomplished by any known method utilizing for Horizontal Axis Wind Turbines.

The rotor 45 is positioned on the carrying construction 23 and has at least two blades 53 arranged along the axis of rotation 47. The rotor 45 has a shaft 55, which rotates in the bearings 57 placed in the arms 61. The arms are fixed to the carrying construction. The shaft 55 is connected by a mechanical transmission consisting of a belt drive 89 to the input shaft of the gear-box 73. The output shaft of the gear-box is connected by the coupling 63 to the driven device 77 (a generator or a pump).

The rotor 45 is positioned along the border 79 of the carrying construction. The rotor is arranged so that less than half of the rotor's diameter protrudes out of the border of the carrying construction.

The transverse section of the carrying construction may have a special shape. This section may be shaped by a first straight line 83 arranged nearest to said rotor, and two other straight lines 85 and 87 adjoining said first straight line at an acute included angle.

In all cases, if one rotor is mounted on the carrying construction, it is arranged along one border of the carrying construction, and if two or more rotors are mounted on the carrying construction, the may be arranged both in one row along one border and in two rows along two borders.

The rotors can be mounted either on the side of the carrying construction opposed to the wind pressure, or on the side which is under the wind pressure.

When the wind power plant contains many rotors, several driven devices may be mounted on the carrying construction. In this case, each driven device will be powered by a separate group of rotors.

Mechanical transmissions used for transmitting power from rotors to driven devices can be different. The mechanical transmissions mentioned above are used as an example only.

Figure 8:
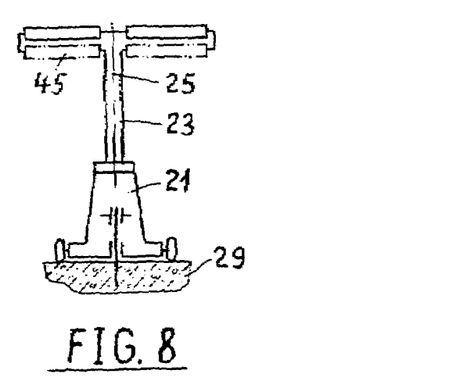
FIG. 8 is a simplified front view of another embodiment of the invention, which has two or four rotors with horizontal axes of rotation.

FIG. 8 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment two or four rotors 45 with horizontal axes of rotation are positioned on the carrying construction 23.

Figure 9:
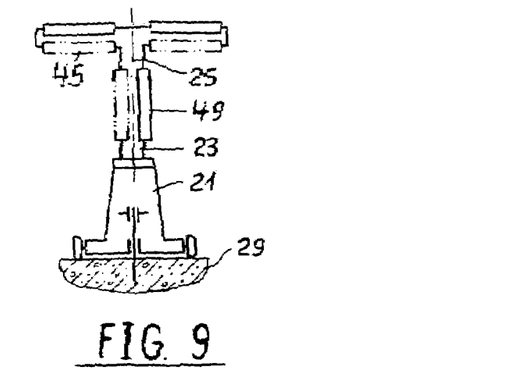
FIG. 9 is a simplified front view of another embodiment of the invention, which has two or four rotors with horizontal axes of rotation and one or two rotors with vertical axes of rotation.

FIG. 9 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment two or four rotors 45 with horizontal and one or two rotors 49 with vertical axes of rotation are positioned on the carrying construction.

Figure 10:
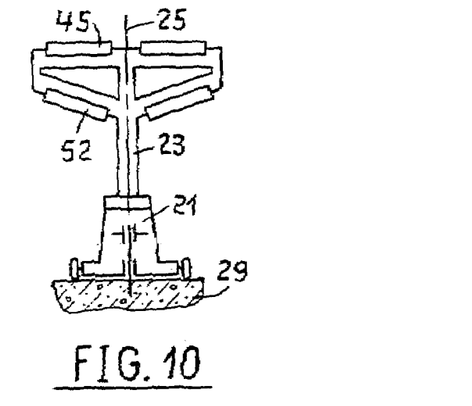
FIG. 10 is a simplified front view of another embodiment of the invention, which has two rotors with horizontal axes of rotation and two rotors with inclined axes of rotation.

FIG. 10 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment two rotors 45 with horizontal and two rotors 52 with inclined axes of rotation are positioned on the carrying construction.

Figure 11:
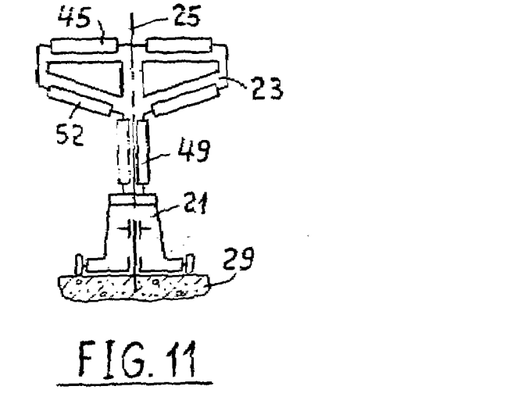
FIG. 11 is a simplified front view of another embodiment of the invention, which has tow rotors with horizontal axes of rotation, two rotors with inclined axes of rotation, and one or two rotors with vertical axes of rotation.

FIG. 11 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment two rotors 45 with horizontal, two rotors 52 with inclined, and one or two rotors 49 with vertical axes of rotation are positioned on the carrying construction.

Figure 12:
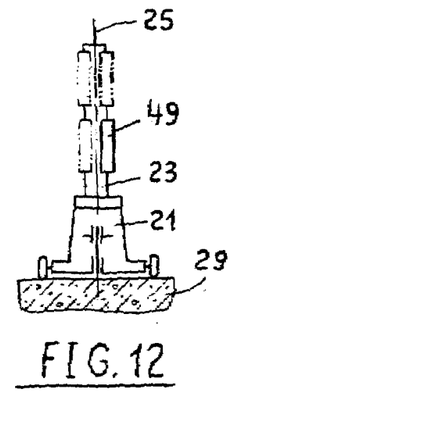
FIG. 12 is a simplified front view of another embodiment of the invention, which has either one, or two, or four rotors with vertical axes of rotation.

FIG. 12 shows another embodiment of the wind power plant. In this embodiment the supporting structure 21 is into fixedly secured to the foundation 29. The carrying construction 23 is fixedly secured to the supporting structure and is rotatable around the vertical axis 25 jointly with the supporting structure. The carrying construction is made as a pillar. The transverse section of the pillar may have a special shape in the places where the rotors are located. This section may be shaped by a first straight line 83 arranged nearest to said rotors, and two other straight lines 85 and 87 adjoining said first straight line at an acute included angle. In this embodiment one or more rotors 49 with vertical axes of rotation are positioned on the carrying construction.

Figure 13:
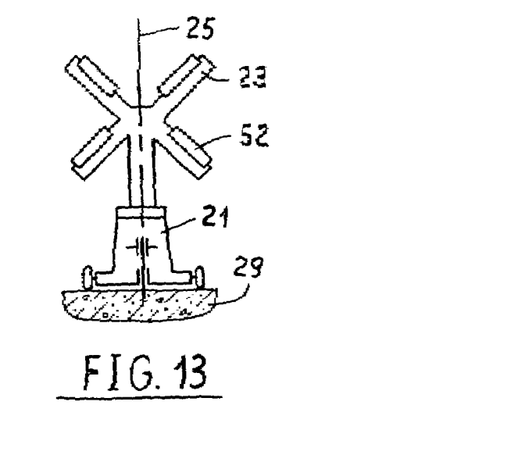
FIG. 13 is a simplified front view of another embodiment of the invention, which has four rotors with inclined axes of rotation.

FIG. 13 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment four rotors 52 with inclined axes of rotation are positioned on the carrying construction.

Figure 14:
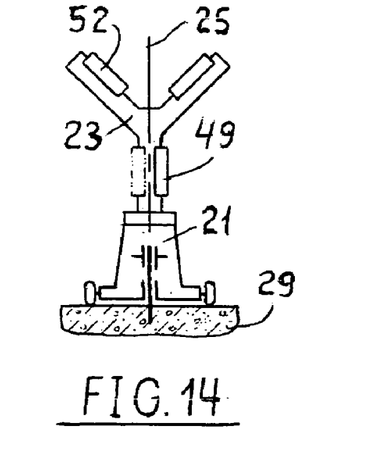
FIG. 14 is a simplified front view of another embodiment of the invention, which has two rotors with inclined axes of rotation and one or two rotors with vertical axes of rotation.

FIG. 14 shows another embodiment of the wind power plant. In this embodiment the supporting structure 21 is not fixedly secured to the foundation 29. The carrying construction 23 is fixedly secured to the supporting structure and is rotatable around the vertical axis 25 jointly with the supporting structure. In this embodiment two rotors 52 with inclined axes and one or two rotors 49 with vertical axes of rotation are positioned on the carrying construction.

Figure 15:
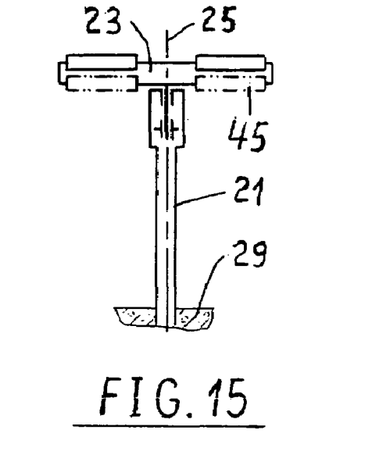
FIG. 15 is a simplified front view of another embodiment of the invention, which has two or four rotors with horizontal axes of rotation.

FIG. 15 shows another embodiment of the wind power plant. In this embodiment the supporting structure 21 is fixedly secured to the foundation 29 and is immovable. The carrying construction 23 is rotatable around the vertical axis 25 and about the immovable supporting structure. In this embodiment two or four rotors 45 with horizontal axes of rotation are positioned on the carrying construction.

Figure 16:
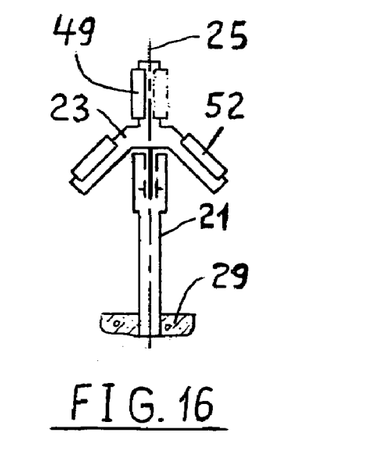
FIG. 16 is a simplified front view of another embodiment of the invention, which has two rotors with inclined axes of rotation and one or two rotors with vertical axes of rotation.

FIG. 16 shows another embodiment of the wind power plant. In this embodiment the supporting structure 21 is fixedly secured to the foundation 29 and is immovable. The carrying construction 23 is rotatable around the vertical axis 25 and about the immovable supporting structure. In this embodiment two rotors 52 with inclined and one or two rotors 49 with vertical axes of rotation are positioned on the carrying construction.

Figure 17:
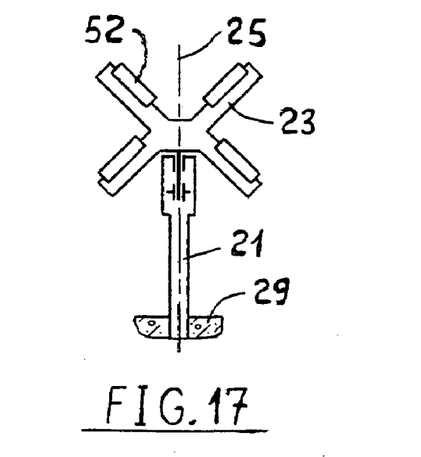
FIG. 17 is a simplified front view of another embodiment of the invention, which has for rotors with inclined axes of rotation.

FIG. 17 shows another embodiment of the wind power plant. In this embodiment the supporting structure 21 is fixedly secured to the foundation 29 and is immovable. The carrying construction 23 is rotatable around the vertical axis 25 and about the immovable supporting structure. In this embodiment four rotors 52 with inclined axes of rotation are positioned on the carrying construction.

Figure 18:
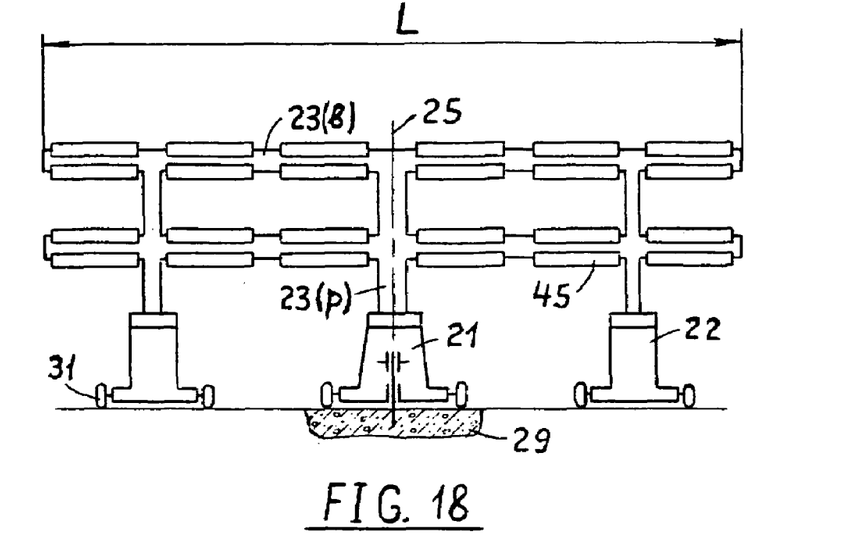
FIG. 18 is as simplified front view of another embodiment of the invention, which has a large number of rotors with horizontal axes of rotation.

FIG. 18 shows another embodiment of the wind power plant. There are three supporting structures in this embodiment. The carrying construction 23(p and b) is fixedly secured to the supporting structures and has a vertical axis 25. The carrying construction is rotatable around the vertical axis 25 jointly with the supporting structures. One supporting structure 21 is installed on the foundation 29 at the vertical axis 25, and two supplementary supporting structures 22 are symmetrized to the vertical axis 25. All supporting structures are installed on turning elements 31. The carrying construction consist of three pillars 23(p) and four horizontal beams 23(b). In this embodiment a large number of rotors 45 with horizontal axes of rotation is positioned on the beams. On each beam the rotors are positioned in two rows.

This embodiment allows for the creation of high power wind plants which can produce energy both under high and under low wind speeds.

Figure 19:
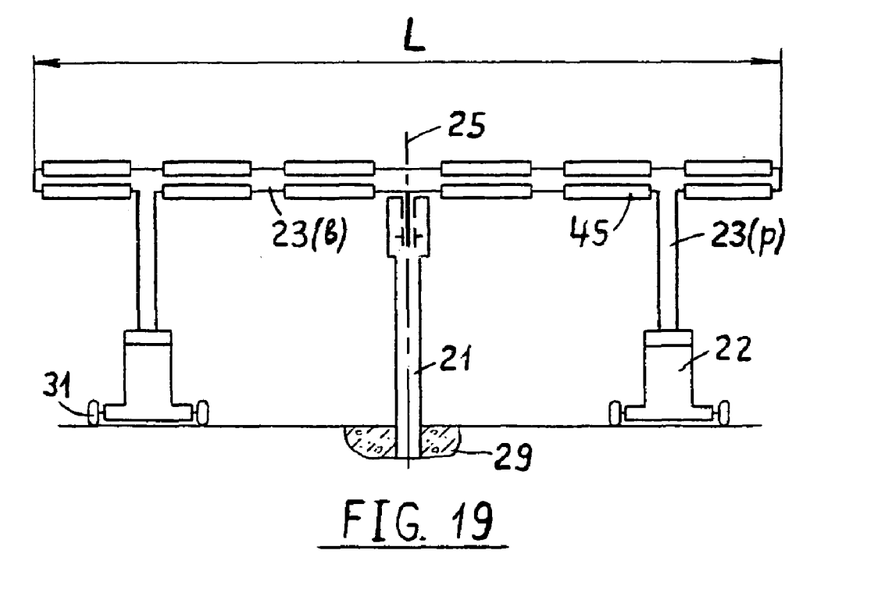
FIG. 19 is a simplified front view of another embodiment of the invention, which has a large number of rotors with horizontal axes of rotation.

FIG. 19 shows another embodiment of the wind power plant. There are three supporting structures in this embodiment. One supporting structure 21 is installed on the foundation 29, fixedly secured to it, and is immovable. Two supplementary supporting structures 22 are symmetrized to the supporting structure 21 and are installed on the turning elements 31. The carrying construction 23(p and b) is fixedly secured to supplementary supporting structures 22 only and has a vertical axis 25. The carrying construction is rotatable around the vertical axis 25 jointly with the supplementary supporting structures. The carrying construction consist of two pillars 23(p) and the horizontal beam 23(b). In this embodiment a large number of rotors 45 with horizontal axes of rotation is positioned on the beam. The rotors are positioned in two rows.

This embodiment allows for the creation of high power wind plants which can produce energy both under high and under low wind speeds.

FIGS. 18 and 19 show embodiments with two supplementary supporting structures. The number of supplementary supporting structures depends on the size "L" of the carrying construction. When the size "L" is greater, the number of supplementary supporting structures is also greater.

From the description above principal advantages of the present invention become evident. The wind power plant of the present invention can produce useful energy both under high and under low wind speeds and this energy will be cheaper than energy produced known wind turbines. That is why it will find a great circulation.

The scope of the invention should be determined by the appended claims and their legal equivalents, rather than by the examples given.

What is claimed is:

1. A wind power plant comprising:
   at least one supporting structure;
   a carrying construction arranged on said supporting structure and fixedly secured to said supporting structure, said carrying construction having a vertical axis and being rotatable around said vertical axis jointly with said supporting structure, said carrying construction comprising at least one pillar and at least one horizontal beam attached to said pillar, said beam having two outer borders extended along said beam;
   at least two rotors positioned on said beam, said rotors having horizontal axes of rotation and at least two blades arranged along said rotors' axes of rotation, said rotors' axes of rotation being parallel to said beam borders, said rotors being positioned so that less than half of the rotors' diameters protrudes out of one of said beam borders, each said rotor having an individual shaft, each said shaft being positioned in two of its own bearings, in which there is a clearance between two adjacent bearings of aligned ones of said rotors, said shafts of aligned rotors are connected by couplings, and said couplings are arranged in said clearance; and
   a foundation.

2. The wind power plant of claim 1, wherein a transverse section of said beam, in places where said rotors are located, is shaped by a first straight line arranged nearest to said rotors, and two other straight lines adjoining said first straight line at an acute included angle.

3. The wind power plant of claim 1, further comprising at least one additional rotor having a vertical axis of rotation and positioned on said pillar.

4. The wind power plant of claim 1, further comprising at least two inclined beams attached to said pillar and at least two additional rotors having inclined axes of rotation and being positioned on said inclined beams.

5. The wind power plant of claim 4, further comprising at least one additional rotor having a vertical axis of rotation and being positioned on said pillar.

6. A wind power plant comprising:
   a supporting structure;
   a carrying construction arranged on said supporting structure and fixedly secured to said supporting structure, said carrying construction having a vertical axis and being rotatable around said vertical axis jointly with said supporting structure, said carrying construction being made as a pillar in the form of a single vertical trunk with two outer borders extended along said pillar;
   at least one rotor positioned on said carrying construction, in which each of said rotors has a vertical axis of rotation and at least two blades arranged along said rotor's axis of rotation, said rotor's axis of rotation being parallel to said borders, said rotor being positioned so that less than half of the rotor's diameter protrudes out of one of said pillar borders, and each of said rotors having an individual shaft, each said shaft positioned in two of its own bearings, in which there is a clearance between two adjacent bearings of aligned ones of said rotors, said shafts of aligned rotors are connected by couplings, and said couplings are arranged in said clearance; and a foundation.

7. The wind power plant of claim 6, wherein a transverse section of said pillar in places where said rotors are located is shaped by a first straight line arranged nearest to said rotors, and two other straight lines adjoining said first straight line at an acute included angle.

8. A wind power plant comprising:
   a supporting structure;
   a carrying construction arranged on said supporting structure and fixedly secured to said supporting structure, said carrying construction having a vertical axis and being rotatable around said vertical axis jointly with said supporting structure, said carrying construction comprising a pillar made in the form of a single vertical trunk and at least two inclined beams attached to said pillar, each of said beams having two outer borders extended along said beam;
   at least two rotors positioned on said beams, said rotors having inclined axes of rotation and at least two blades arranged along said rotors' axes of rotation, said rotors' axis of rotation being parallel to said borders, said rotors being positioned so that less than half of the rotors' diameters protrudes out of one of said beam borders; and
   a foundation.

9. The wind power plant of claim 8, further comprising at least one rotor having a vertical axis of rotation and positioned on said pillar.

10. A wind power plant comprising:
    a foundation;
    a supporting structure fixedly secured to said foundation, said supporting structure being made as a pillar;
    a carrying construction arranged on said supporting structure, said carrying construction having a vertical axis and being rotatable around said vertical axis, said carrying construction being made as a horizontal beam arranged in operation across an air stream, said beam having sheeted surfaces taking up the wind pressure and not allowing the air stream to pass into said beam, said beam having two outer borders extended along said beam, in which one of said borders is positioned on the top of said beam, and another of said borders is positioned below said beam; and
    a rotor positioned on said beam, said rotor having a horizontal axis of rotation and at least two blades arranged along said rotor's axis of rotation, said rotor's axis of rotation being parallel to said borders, said rotor being positioned so that less than half of the rotor's diameter protrudes out of one of said borders.

11. A wind power plant comprising:
    a foundation;
    a supporting structure fixedly secured to said foundation, said supporting structure being made as a pillar in the form of a single vertical trunk;
    a carrying construction arranged on said supporting structure, said carrying construction having a vertical axis and being rotatable around said vertical axis, said carrying construction having at least one horizontal beam with two outer borders extended along said beam, one of said borders being positioned on the top of said beam, and another of said borders being positioned below said beam; and
    at least two rotors positioned on said carrying construction, said rotors having horizontal axes of rotation and at least two blades arranged along said rotors' axes of rotation, said rotors' axes of rotation being parallel to said borders, said rotors being positioned so that less than half of the rotors' diameters protrudes out of one of said beam borders, each said rotor having an individual shaft, each said shaft positioned in two of its own bearings, in which there is a clearance between two adjacent bearings of aligned ones of said rotors, said shafts of aligned rotors are connected by couplings, and said couplings are arranged in said clearance.

12. The wind power plant of claim 11, further comprising a pillar attached to said horizontal beam and at least one additional rotor having a vertical axis of rotation and being positioned on said pillar.

13. The wind power plant of claim 11, further comprising at least two supplementary supporting structures symmetrized about said vertical axis of said carrying construction, each of said supplementary supporting structures being disposed on turning elements apart from said fixedly secured to foundation central supporting structure, said supplementary supporting structures being fixedly secured to said carrying construction and being rotatable jointly with said carrying construction around said vertical axis of said carrying construction.

14. A wind power plant comprising:
    a foundation;
    a supporting structure fixedly secured to said foundation;
    a carrying construction arranged on said supporting structure, said carrying construction having a vertical axis and being rotatable around said vertical axis, said carrying construction comprising at least one member with two outer borders extended along said member; and
    at least one rotor having a vertical axis of rotation and at least two rotors respectively having an inclined axis of rotation positioned on said carrying construction, said rotors having at least two blades arranged along said rotors' axis of rotation, said rotors' axes of rotation being parallel to said borders, said rotors being positioned so that less than half of each of the rotors' diameters protrudes out of one of said borders.

15. A wind power plant comprising:
    a foundation;
    a supporting structure fixedly secured to said foundation;
    a carrying construction arranged on said supporting structure, said carrying construction having a vertical axis and being rotatable around said vertical axis, said carrying construction having at least one member with two outer borders extended along said member; and
    at least four rotors positioned on said carrying construction, said rotors respectively having an inclined axis of rotation and at least two blades arranged along said rotors' axis of rotation, said rotors' axes of rotation being parallel to said borders, said rotors being positioned so that less than half of each of the rotors' diameters protrudes out of one of said borders.

* * * * *

UNITED STATES PATENT AND TRADEMARK OFFICE
CERTIFICATE OF CORRECTION

PATENT NO. : 7,189,051 B1  
APPLICATION NO. : 11/368567  
DATED : March 13, 2007  
INVENTOR(S) : Nuhim Heifets Page 1 of 1

It is certified that error appears in the above-identified patent and that said Letters Patent is hereby corrected as shown below:

On The Title page, Item (76)  
The correct address of the inventor is:

1000 North Curson Avenue, Apt. 5  
Los Angeles, CA 90046-6419

Signed and Sealed this

Twenty-ninth Day of May, 2007

JON W. DUDAS  
*Director of the United States Patent and Trademark Office*